US011214133B2

(12) United States Patent
Mathews (10) Patent No.: US 11,214,133 B2
(45) Date of Patent: Jan. 4, 2022

(54) VEHICLE SOFT-TOP SECURITY DEVICE (71) Applicant: ONE-T, LLC, Sycamore, IL (US)

(72) Inventor: Brian Mathews, Sycamore, IL (US)

(73) Assignee: ONE-T, LLC, Sycamore, IL (US)

( * ) Notice: Subject to any disclaimer, the term of this patent is extended or adjusted under 35 U.S.C. 154(b) by 55 days.

(21) Appl. No.: 16/553,207

(22) Filed: Aug. 28, 2019

(65) Prior Publication Data
US 2020/0070634 A1 Mar. 5, 2020

Related U.S. Application Data (60) Provisional application No. 62/724,685, filed on Aug. 30, 2018.

(51) Int. Cl.
B60J 7/12 (2006.01)

(52) U.S. Cl.
CPC .................................... B60J 7/123 (2013.01)

(58) Field of Classification Search
CPC ..... B60J 7/10; B60J 7/102; B60J 7/104; B60J 7/1291; B60J 7/106; B60J 7/123
USPC ............................................. 296/121, 107.15
See application file for complete search history.

(56) References Cited

U.S. PATENT DOCUMENTS

| 2,591,380 | A | * | 4/1952 | Schreiner | B60P 3/423 296/186.5 |
| 5,486,031 | A | * | 1/1996 | Ronchetti | B60J 7/104 296/10 |
| 5,829,195 | A | * | 11/1998 | Ojanen | B60J 1/085 49/166 |
| 6,206,454 | B1 | * | 3/2001 | Cory | B60J 7/10 160/273.1 |
| 6,827,391 | B1 | * | 12/2004 | Kohn | B60J 7/10 160/327 |
| 6,851,739 | B2 | * | 2/2005 | Morley | B60J 1/08 280/756 |
| 8,256,819 | B1 | * | 9/2012 | Gregory | B60R 9/065 296/37.6 |
| 8,973,970 | B2 | * | 3/2015 | Haberkamp | B60J 1/085 296/107.09 |
| 8,991,896 | B1 | * | 3/2015 | Whitehead | B60J 7/106 296/121 |
| 9,114,690 | B1 | * | 8/2015 | Bowles | B60J 7/1635 |
| 2016/0046241 | A1 | * | 2/2016 | Crismon | B60J 7/102 224/326 |
| 2020/0254859 | A1 | * | 8/2020 | Gauci | B60J 7/1234 |
| 2021/0268883 | A1 | * | 9/2021 | Smith | B60J 7/028 |

FOREIGN PATENT DOCUMENTS

CN 112248774 A * 1/2013 ............. B60J 7/104

* cited by examiner

Primary Examiner — D Glenn Dayoan
Assistant Examiner — Kevin P Weldon (57) ABSTRACT A vehicle soft-top security device to deter theft and damage. The device includes multiple rigid sections coupled to a vehicle interior to the soft-top. The panels are attached via factory features of the vehicle and can be a full time retrofit or assembled and disassembled when needed.

5 Claims, 9 Drawing Sheets

VEHICLE SOFT-TOP SECURITY DEVICE

CROSS-REFERENCE TO RELATED APPLICATION

This application claims the benefit of U.S. Provisional Patent Application No. 62/724,685 filed Aug. 30, 2018, which is hereby incorporated by reference in its entirety herein.

BACKGROUND OF THE INVENTION

I. Field of the Invention

The present disclosure relates generally to vehicle soft-top security devices, and more specifically to a security device positioned within the soft-top of the vehicle for theft and/or damage deterrence.

II. Description of the Prior Art

Certain convertible vehicles, including but not limited to SUVs, sedans and coups, have so-called soft-top roofs that are highly susceptible to break-ins and damage. This is especially true with those types of soft-tops that are removed and attached by hand vs. vehicle power. Indeed, it has been found that these soft-tops can be removed by hand and/or with a cutting tool or the like without an owner key. Once inside, the perpetrator can steal personal property and damage what is desired, and perhaps even steal the vehicle.

The present disclosure overcomes the problems associated with the aforementioned conventional soft-top convertible vehicles. Accordingly, it is a general object of this disclosure to provide a vehicle soft-top security device.

It is another general object of the present disclosure to provide a security device positioned within the vehicle soft-top.

It is a more specific object of the present disclosure to provide a multiple piece panel design attached to the vehicle using factory mounting points.

These and other objects, features and advantages of this disclosure will be clearly understood through a consideration of the following detailed description.

SUMMARY OF THE INVENTION

According to an embodiment of the present disclosure, there is provided a device for securing a vehicle soft-top including rigid left, right and rear panels that securely engage with cooperating adapters mounted on the vehicle mounting points and with one another.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which.

DESCRIPTION OF THE PREFERRED EMBODIMENTS

One or more embodiments of the subject disclosure will now be described with the aid of numerous drawings. Unless otherwise indicated, use of specific terms will be understood to include multiple versions and forms thereof.

It will be appreciated that while the vehicle soft-top security device will now be shown and described as an aftermarket fix, it is not limited thereto. In any event, such a device would preferably, but not necessarily, be positioned within the soft-top of the vehicle. For example, the embodiments herein will illustrate a three-piece panel design that is attached to the vehicle using factory mounted point to point brackets. When disassembled, the unit folds and can be placed and stored between the wheel well (for example) of the vehicle.

One embodiment includes hard panels or screens that would be placed behind the soft side and rear panels of the vehicle. The mounting of the panels shall not be limited, and they can be left attached at all times or assembled and disassembled when needed. The panels can be individual, or a single unit that folds. All of the panels, whether a singular folding unit or multiple individual panels can also be stored on the floor (for example) behind the seats.

Another embodiment replaces the soft side panels of the vehicle and creates a hybrid top system. This system would basically be a hard-top bottom, with a full top portion of the soft-top in place. When the back panel and sides are removed, the top can be fully lowered. The user can also fold the fold-top back part way, as currently able to do so by design.

Figure 1:
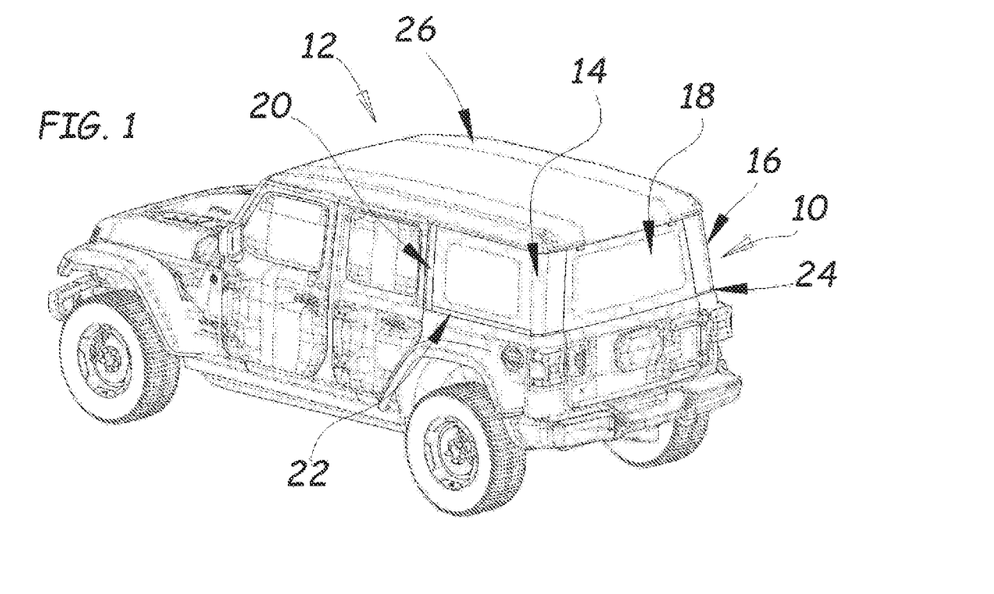
FIG. 1 is a rear perspective view of an exemplar vehicle including the vehicle soft-top security device according to the principles of an embodiment of the present disclosure.

Turning now to the figures, and in particular FIG. 1, an embodiment of the vehicle soft-top security device 10 is illustrated within an exemplar vehicle 12 in the perspective view. The main component parts of the device 10 includes the left 14 and right 16 solid side panels that would replace the textile factory components, and the rigid rear panel 18 that replaces the factory textile rear panel. Each of the panels having a top, bottom, left and right portion. Additionally, the device 10 may also include a rear door trim rail 20 (or a vertical or an upright channel/adapter bracket) that is mounted using factory mounting points. Alternatively, this member can also be a cover that adapts to the factory rear door trim rail. In any event, there are left and right components of this part 20 (passenger side not shown). Furthermore, the device 10 may also include side rail adapter brackets, left 22 and right 24, (or horizontal channels or brackets) that are mounted to the factory side utilizing factory mounting points. The top portion 26 of the factory soft-top includes all internal mounting brackets and supports.

Figure 2:
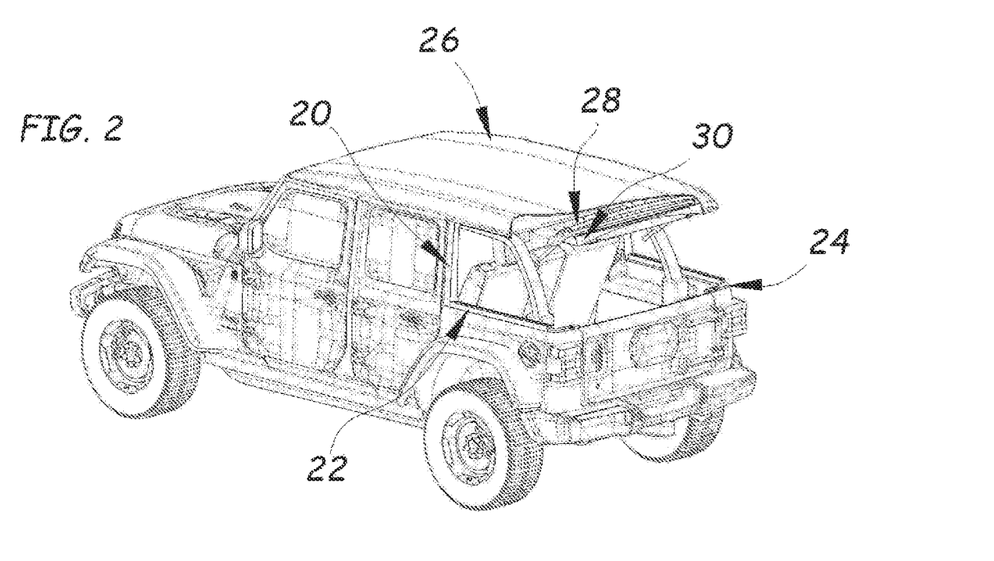
FIG. 2 is a broken detailed view of FIG. 1.

FIG. 2 shows a more detailed view of FIG. 1. Specifically, the rear factory support structure 28 of the vehicle 12 is illustrated. This structure has factory locating points used for its assembly and weldment. A rigid rear upper cross support 30 is mounted on the support structure 28 utilizing the locating points. This cross support 30 will allow engagement of the rigid side panels (14, 16). When this cross support is installed, the factory soft-top 26 fully retracts as intended from the factory.

Figure 3:
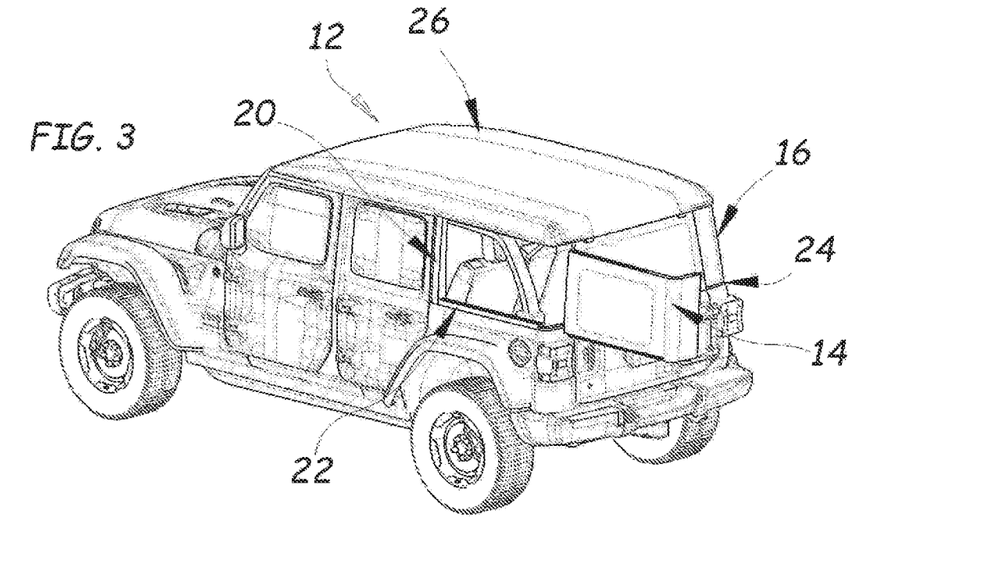
FIG. 3 is a rear perspective view of the vehicle of FIG. 1 showing device installation.
Figure 4:
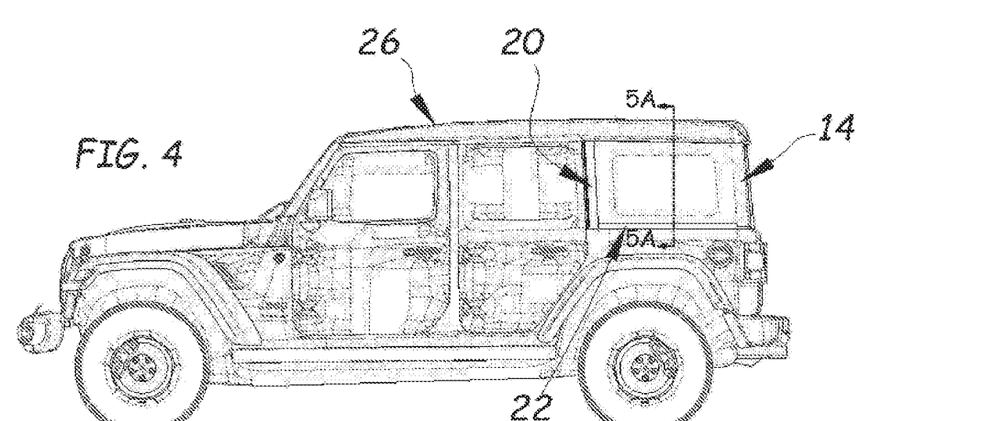
FIG. 4 is a side view of FIG. 1 showing internal details thereof.

Component installation will now be shown in FIG. 3. In particular, after the rear door trim rails 20 and the side rail adapter brackets 22, 24 are mounted to the vehicle 12, the solid side panels 14, 16 slide into place from the rear of the vehicle 12. The lower portion of the panels 14, 16 include features that, when slid into their installed positions (FIG. 4), allow engagement with the rear door trim rails 20 and the side rail adapter brackets. For example, panel 14 is slid forward using an engagement feature between the bottom of the panel 14 and the top of the side rail adapter bracket 22. Examples of such engagements include, but are not limited to, T-slots, dovetails or the like that provide secure attachment between the components. When panel 14 is slid fully forward, the front of side bracket 22 and the rear of the door trim rail 20 form an engagement. This engagement may be tongue and groove, or the like, so long as a secure engagement is provided between the components at installation. After the solid side panels 14, 16 have been installed and secured, the rear panel 18 is ready for installation.

Figure 5A:
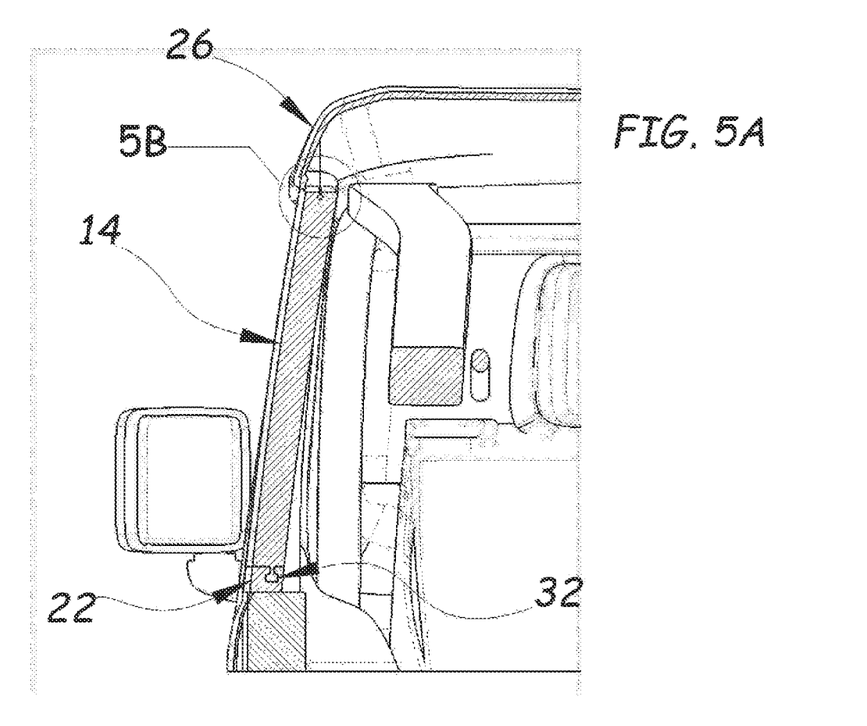
FIG. 5A is a cross-sectional view of the internal section details of the vehicle soft-top security device according to the principles of an embodiment of the present disclosure taken along lines 5A-5A of FIG. 4.
Figure 5B:
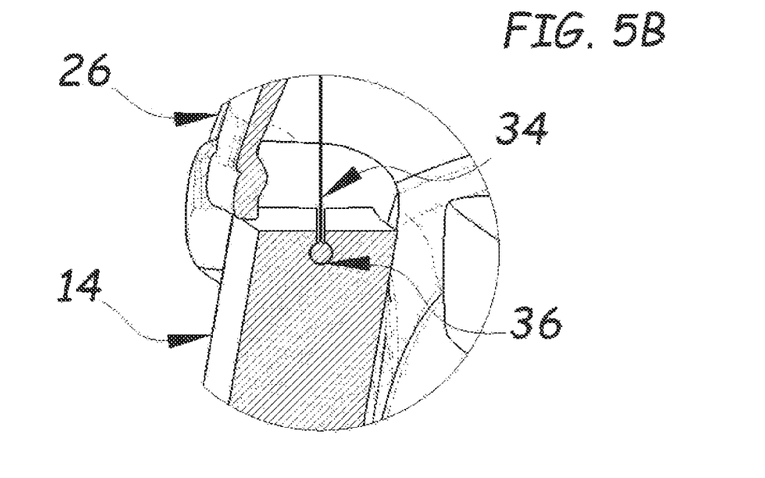
FIG. 5B is an enlarged view of section 5B of FIG. 5A.

FIGS. 5A and 5B more particularly illustrate an embodiment of these engagement features. Were a T-slot 32 is shown for the lower engagement between the side rail bracket 22 and the side panel 14. Additionally, the factory mounting tube 34 is attached to the factory soft-top by fabric. This tube is coupled to the female engagement portion 36 of the side panel 14. Accordingly, when the panel 14 is slid into position, the engagement points are the T-slot 32 on the bottom and the coupling of the mounting tube 34 and the female member 36 on the top.

Figure 6:
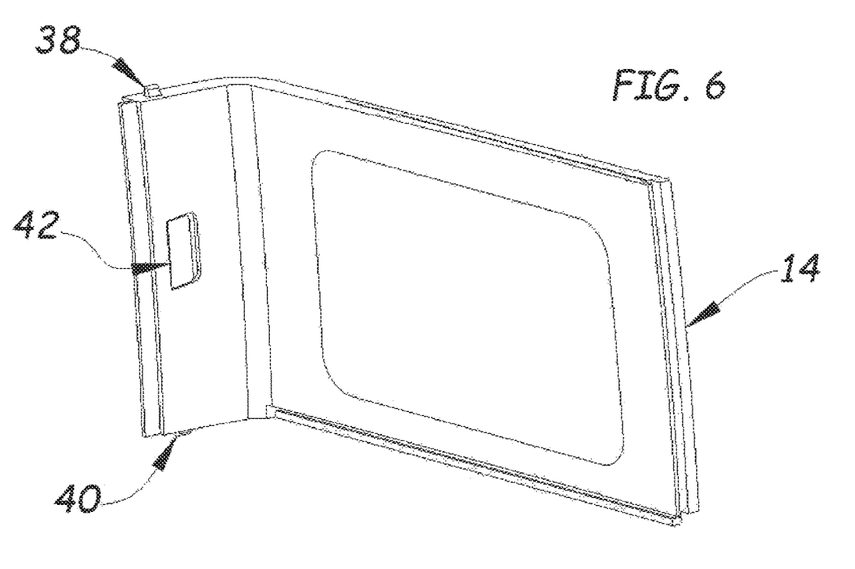
FIG. 6 is a front view of a side panel of the vehicle soft-top security device according to the principles of an embodiment of the present disclosure.

FIG. 6 shows some additional engagement features of the side panels. Specifically, an upper male locking mechanism 38 and a lower male locking mechanism 40 are actuated by hand latch 42 during removal of the panel 14.

Figure 7:
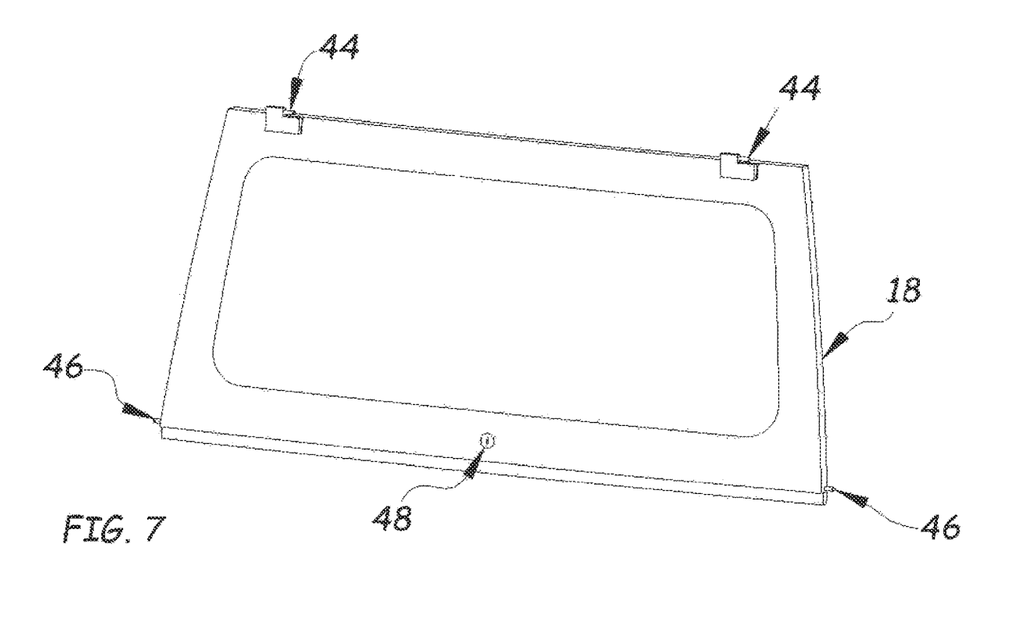
FIG. 7 is an outside view of a rear panel of the vehicle soft-top security device according to the principles of an embodiment of the present disclosure.
Figure 8:
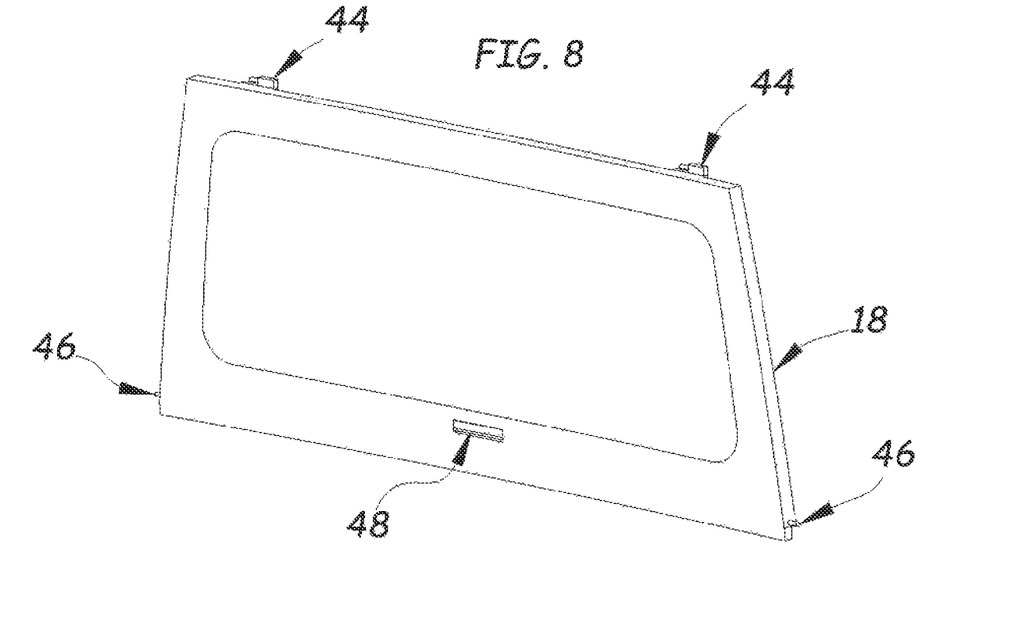
FIG. 8 is an inside view of a rear panel of the vehicle soft-top security device according to the principles of an embodiment of the present disclosure.

Turning now to the rigid rear panel 18 and FIGS. 7 and 8, the engagement features thereof will be shown and described. The rear panel includes a pair of barrel hinges 44 or the like to enable opening of the panel 18. Locking pins 46 on the bottom sides of the panel 18 engage the side rail brackets 22, 24 to secure the panel 18. And, a keyed paddle lock 48 or the like locks the panel 18 in a closed position.

Figure 9:
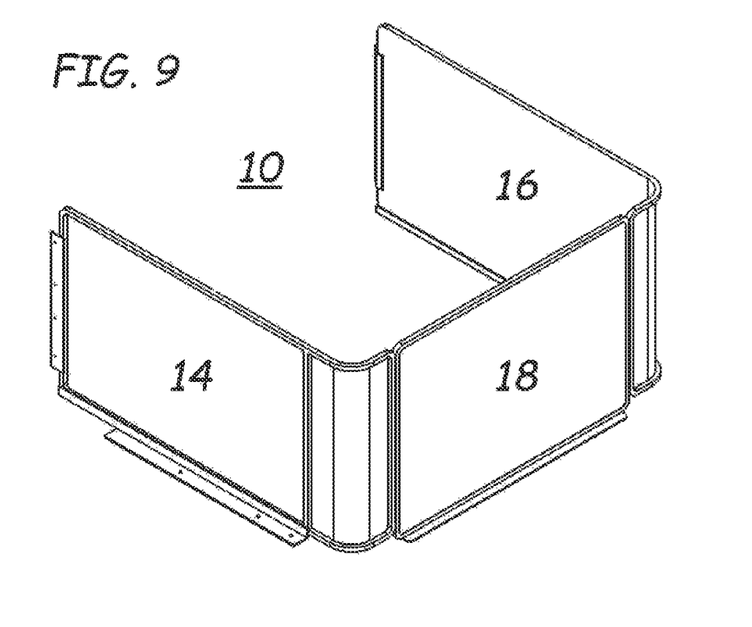
FIG. 9 is a rear perspective view of a three-piece panel design vehicle soft-top security device according to the principles of the present disclosure.

FIG. 9 is illustrative of the three-piece panel design of the soft-top security device shown in the rear perspective view assembled but not attached to a vehicle. More specifically, the device 10 is shown in a general U-shaped configuration with a left side panel 14 and a right side panel 16 both attached and integral with a rear panel 18.

Figure 10:
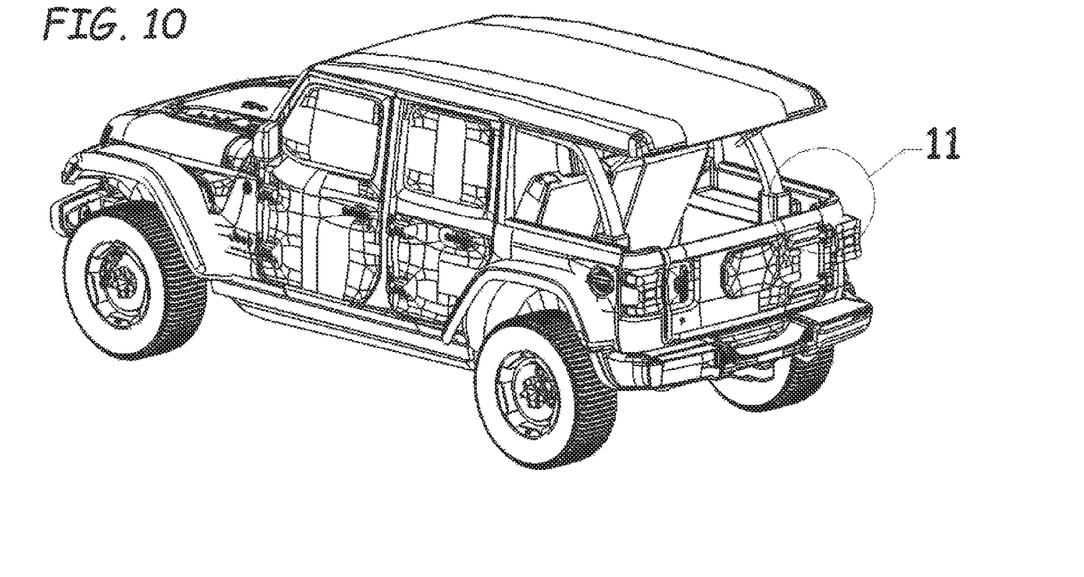
FIG. 10 is a broken detailed view of FIG. 1.
Figure 11:
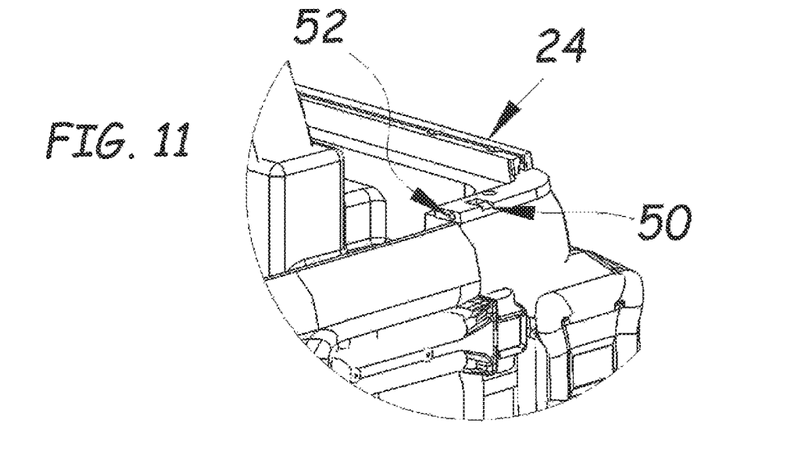
FIG. 11 is an enlarged view of Section 11 of FIG. 10.

Referring now to FIGS. 10 and 11, the lower rear locking features of the device will be shown and described. The male locking feature 50 engages lower male locking feature from the passenger side panel 16. The female locking feature 52 allows locking pin 46 from the rear panel 18 to engage and secure the panel 18.

Figure 12:
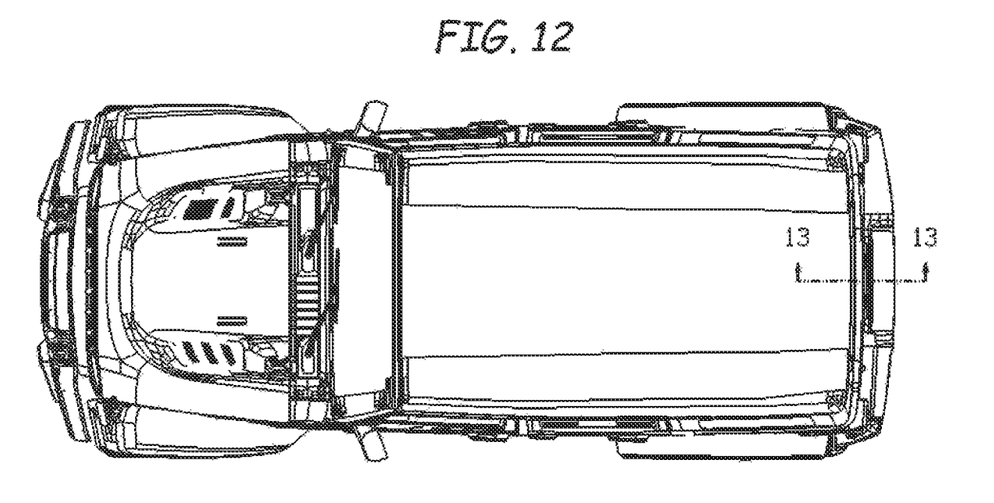
FIG. 12 is a top plan view of the vehicle and device of FIG. 1.
Figure 13:
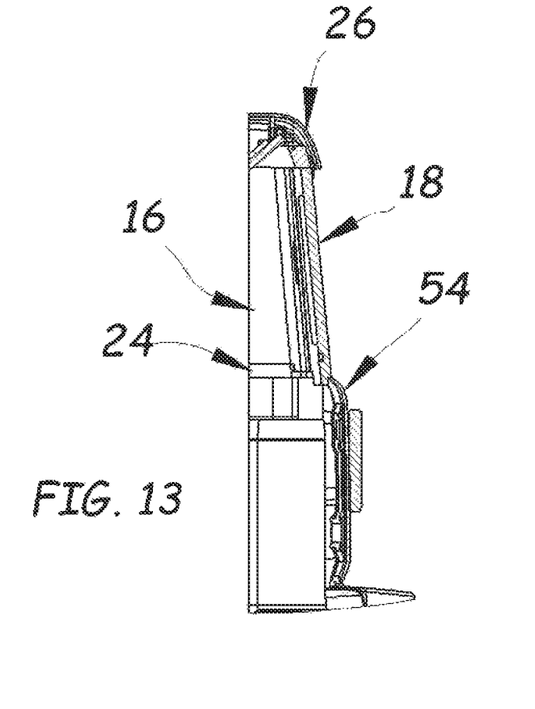
FIG. 13 is a side cross-sectional view taken along lines 13-13 of FIG. 12.

FIGS. 12 and 13 show and describe the rear panel section details and shows how the rear panel 18 is captured behind the tailgate 54.

Figure 14:
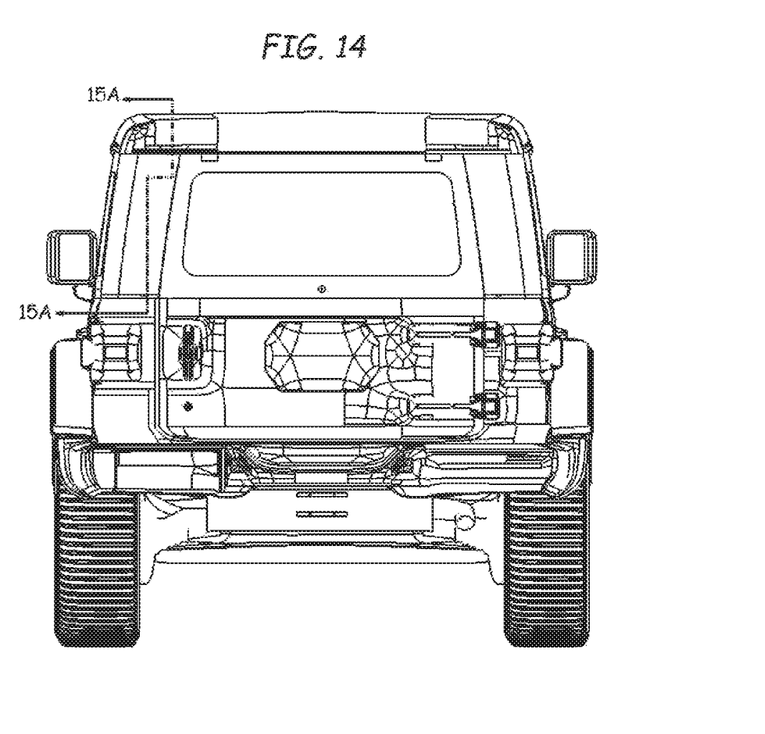
FIG. 14 is a rear view of the vehicle and device of FIG. 1.
Figure 15A:
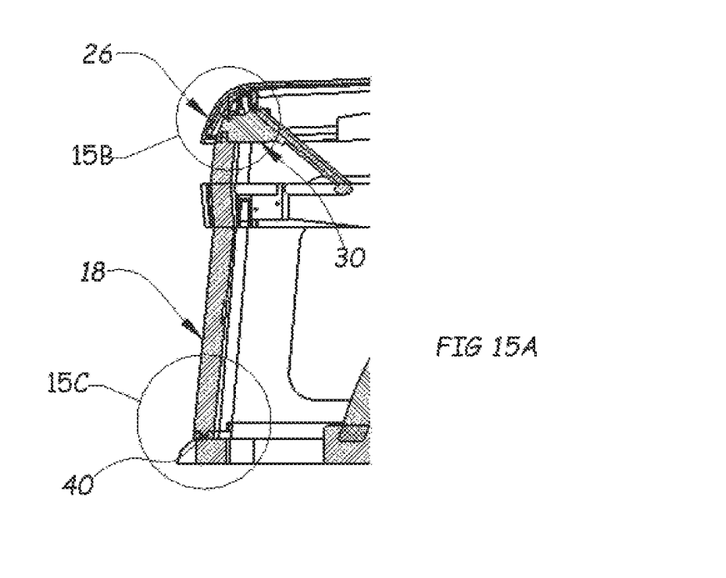
FIG. 15A is a cross-sectional view taken along the lines 15A-15A of FIG. 14.
Figure 15B:
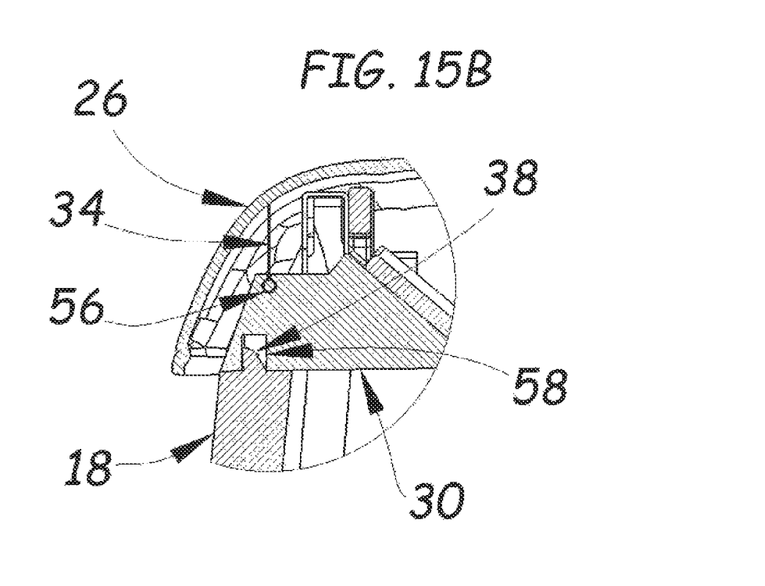
FIG. 15B is an enlarged view of section 15B of FIG. 15A.
Figure 15C:
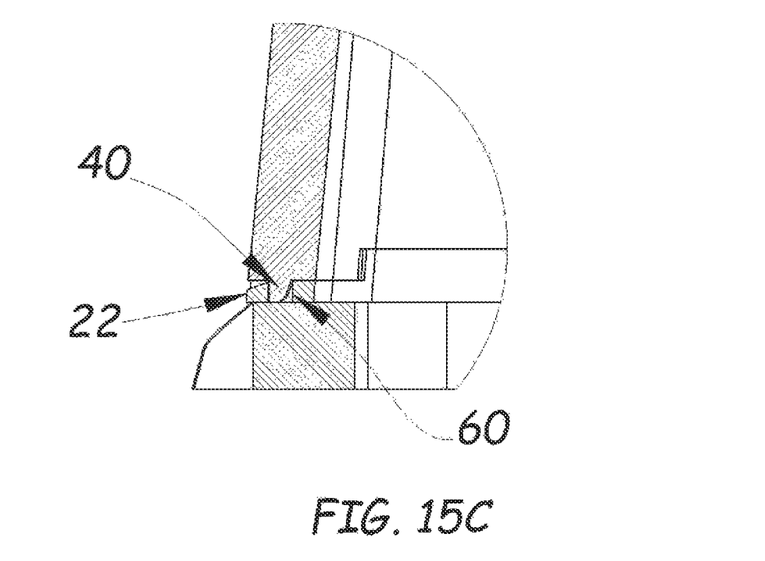
FIG. 15C is an enlarged view of section 15C of FIG. 15A.

FIGS. 14 and 15 will illustrate the driver side locking section in detail. While most of the features have been previously noted herein, the enlarged detail of FIG. 15B is focused on the female engagement portion 56 of the cross support 30 and the lower female locking feature 58 of the cross support. Furthermore, FIG. 15C is focused on the lower female locking feature 60 of the cross support.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention in its broader aspects, and, therefore, the aim in the appended claims is to cover all such changes and modifications as fall within the true spirit and scope of the present disclosure.

What is claimed is:

1. A device for securing a vehicle soft-top having factory soft side and rear panels and a soft top, the device comprising:
   a rigid left side panel having left, right, top and bottom;
   a rigid right side panel having left, right, top and bottom;
   a rigid rear panel having left, right, top and bottom:
   engagement adapters affixed to factory vehicle mounting points on a left side of said vehicle and a right side of said vehicle;
   said left panel securely engaged to said left side adapter, said right panel securely engaged to said right side adapter; and
   said right side of said left panel coupled to said left side of said rear panel and said left side of said right panel coupled to said right side of said rear panel, whereby said left side panel said right side panel and said rear panel are positioned behind said factory soft panels and substantially under and within the factory vehicle soft-top.

2. The device as defined in claim 1 wherein said left and right side engagement adapters are vertical adapters.

3. The device as defined in claim 1 wherein said left and right side engagement adapters are horizontal adapters.

4. The device as defined in claim 3 wherein said adapters are t-slots.

5. The device as defined in claim 1 wherein said device forms a generally U-shaped configuration when assembled.

* * * * *